United States Patent
Evans

(10) Patent No.: US 9,529,729 B2
(45) Date of Patent: Dec. 27, 2016

(54) LOCATION OF MEMORY MANAGEMENT TRANSLATIONS IN AN EMULATED PROCESSOR

(75) Inventor: Matthew L. Evans, Canberra (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 783 days.

(21) Appl. No.: 13/288,506

(22) Filed: Nov. 3, 2011

(65) Prior Publication Data
US 2012/0124271 A1 May 17, 2012

(30) Foreign Application Priority Data
Nov. 16, 2010 (EP) .................................. 10191386

(51) Int. Cl.
*G06F 12/10* (2016.01)
*G06F 9/455* (2006.01)

(52) U.S. Cl.
CPC ........... *G06F 12/1027* (2013.01); *G06F 9/455* (2013.01); *G06F 2212/151* (2013.01)

(58) Field of Classification Search
CPC .................. G06F 12/1027; G06F 2009/45583; G06F 9/45558; G06F 11/3648; G06F 12/1036; G06F 12/109; G06F 2212/151; G06F 9/455; G06F 12/0284; G06F 12/0875; G06F 12/1009; G06F 2212/152; G06F 2212/50; G06F 2212/65; G06F 2212/657; G06F 2212/68; G06F 2212/7201; G06F 12/10; G06F 12/145; G06F 12/145
USPC ...... 711/6, 207, E12.061, E12.065, E12.068, 711/165, 203; 703/23; 718/1
See application file for complete search history.

(56) References Cited

U.S. PATENT DOCUMENTS

| | | | |
|---|---|---|---|
| 7,035,963 B2 * | 4/2006 | Neiger et al. ..................... 711/6 |
| 7,734,873 B2 * | 6/2010 | Lauterbach et al. .......... 711/129 |
| 2004/0054518 A1 * | 3/2004 | Altman et al. .................. 703/27 |
| 2008/0282056 A1 * | 11/2008 | Bond ................... G06F 9/45537 711/207 |
| 2008/0288940 A1 * | 11/2008 | Adams ................ G06F 9/45504 718/1 |
| 2009/0119089 A1 * | 5/2009 | Gheith ................ G06F 9/45537 703/23 |
| 2010/0218183 A1 * | 8/2010 | Wang .................... G06F 1/3228 718/1 |
| 2010/0235831 A1 * | 9/2010 | Dittmer ............... G06F 9/45558 718/1 |
| 2011/0010483 A1 * | 1/2011 | Liljeberg .......................... 711/6 |
| 2012/0047348 A1 * | 2/2012 | Devine et al. ................ 711/206 |

* cited by examiner

*Primary Examiner* — Zhuo Li
(74) *Attorney, Agent, or Firm* — Patterson + Sheridan, LLP

(57) ABSTRACT

A method and system for location of memory management translations in an emulated processor. The method includes: detecting a page miss of a process on an emulated processor, wherein the emulated processor software refills a translation lookaside buffer (TLB); locating a secondary data structure in memory; fetching a missing translation from a secondary data structure in memory; and inserting the missing translation in a guest translation lookaside buffer; wherein the steps are carried out in a trap handler in the emulated environment. The steps may be carried out in the emulated processor or in a host server of the emulated processor instead of invoking a guest operating system trap handler.

11 Claims, 4 Drawing Sheets

LOCATION OF MEMORY MANAGEMENT TRANSLATIONS IN AN EMULATED PROCESSOR

This invention relates to the field of software emulation of computer processors. In particular, the invention relates to location of memory management translations in emulated processors.

Some forms of emulated processors use software translation lookaside buffer (TLB) refill, as opposed to processors that employ hardware page table walkers to refill their TLBs.

Software emulation of a computer system often uses software routines to maintain updates to its memory management translations. Such emulated systems include reduced instruction set computer (RISC) architectures such as SPARC (Scalable Processor Architecture) (SPARC is a trade mark of SPARC International, Inc.) and MIPS (Microprocessor without Interlocked Pipeline Stages) (MIPS is a trade mark of MIPS Computer Systems) processors. When emulating a system of these processors, often a significant proportion of time is spent executing emulated code to perform memory management maintenance which decreases the performance of the emulation.

Taking the example of the SPARC processor, when a memory operation accesses a virtual address not present in the set of current translation lookaside buffer (TLB) entries, a software trap is taken. The trap handler uses the virtual address to locate a translation in a secondary data structure in main memory, then inserts that translation into the TLB and restarts the original memory access. If a translation is not found in the data structure, the trap handler enters the operating system fault handler which will then deal with the page miss. This 'software refill' system is used by MIPS in the same way, and differs from other systems that employ a hardware page table walker to automatically fetch TLB entries from the memory data structure/page table.

Functionally, when emulating a software-refilled system one can simply invoke the guest operating system's TLB miss trap handler. However, the emulator may have different relative costs for executing code, taking (and returning from) traps, etc. to the original emulated hardware. Emulating the trap and handler code may be costly and TLB misses may occur hundreds of thousands of times per second.

According to a first aspect of the present invention there is provide a method for locating memory management translations in an emulated processor, comprising: detecting a page miss of a process on an emulated processor, wherein the emulated processor software refills a translation lookaside buffer (TLB); locating a secondary data structure in memory; fetching a missing translation from the secondary data structure in memory; and inserting the missing translation in a guest translation lookaside buffer (TLB); wherein the steps are carried out in the emulated environment and not by a guest operating system.

According to a second aspect of the present invention there is provided a computer software product for memory management translations in an emulated processor, the product comprising a computer-readable storage medium having computer readable program code embodied therewith, the computer readable program code configured to: detect a page miss of a process on an emulated processor, wherein the emulated processor software refills a translation lookaside buffer (TLB); locate a secondary data structure in memory; fetch a missing translation from the secondary data structure in memory; and insert the missing translation in a guest translation lookaside buffer; wherein the steps are carried out in the emulated environment and not by a guest operating system.

According to a third aspect of the present invention there is provided a system for memory management translations in an emulated processor, comprising: a host server hosting an emulated processor, wherein the emulated processor software refills a translation lookaside buffer (TLB); a guest process operating on the emulated processor; a trap handler provided in the emulated environment including: a miss detecting component for detecting a page miss of a process; a locating component for locating a secondary data structure in memory; a fetching component for fetching a missing translation from a secondary data structure in memory; an inserting component for inserting the missing translation in a guest translation lookaside buffer.

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system are described in which in a software emulation of a computer system using software routines to maintain updates to its memory management translations, instead of invoking the guest operating system trap handler, the emulation environment itself arranges to fetch missing translation lookaside buffer (TLB) entries from a secondary data structure in memory, inserting them in the guest TLB, which in turn updates the emulator's guest virtual-to-physical mapping.

This eliminates raising a trap and returning from the trap and executing the emulated handler code out of the critical path of the guest operating system, increasing performance.

Memory management involves providing ways to allocate portions of memory to programs at their request, and freeing it for reuse when no longer needed. The management of main memory is critical to the computer system. Virtual memory systems separate the memory addresses used by a process from actual physical addresses. This allows separation of processes and increases the effective available amount of random access memory (RAM) using disk swapping.

Memory management units (MMUs) typically divide the virtual address space (the range of addresses used by the processor) into pages. The MMU translates virtual page numbers to physical page numbers via a cache called a translation lookaside buffer (TLB). When the TLB cannot provide a translation, a slower mechanism involving hardware-specific data structures or software assistance is used.

The data found in such data structures are typically called page table entries (PTEs), and the data structure itself is typically called a page table. The physical page number is combined with the page offset to give the complete physical address.

Page translations are cached in a TLB. Some systems, mainly RISC designs, trap into the operating system when a page translation is not found in the TLB. Most other systems use a hardware-based tree walker. Most systems allow the MMU to be disabled; some disable the MMU when trapping into OS code.

Figure 1:
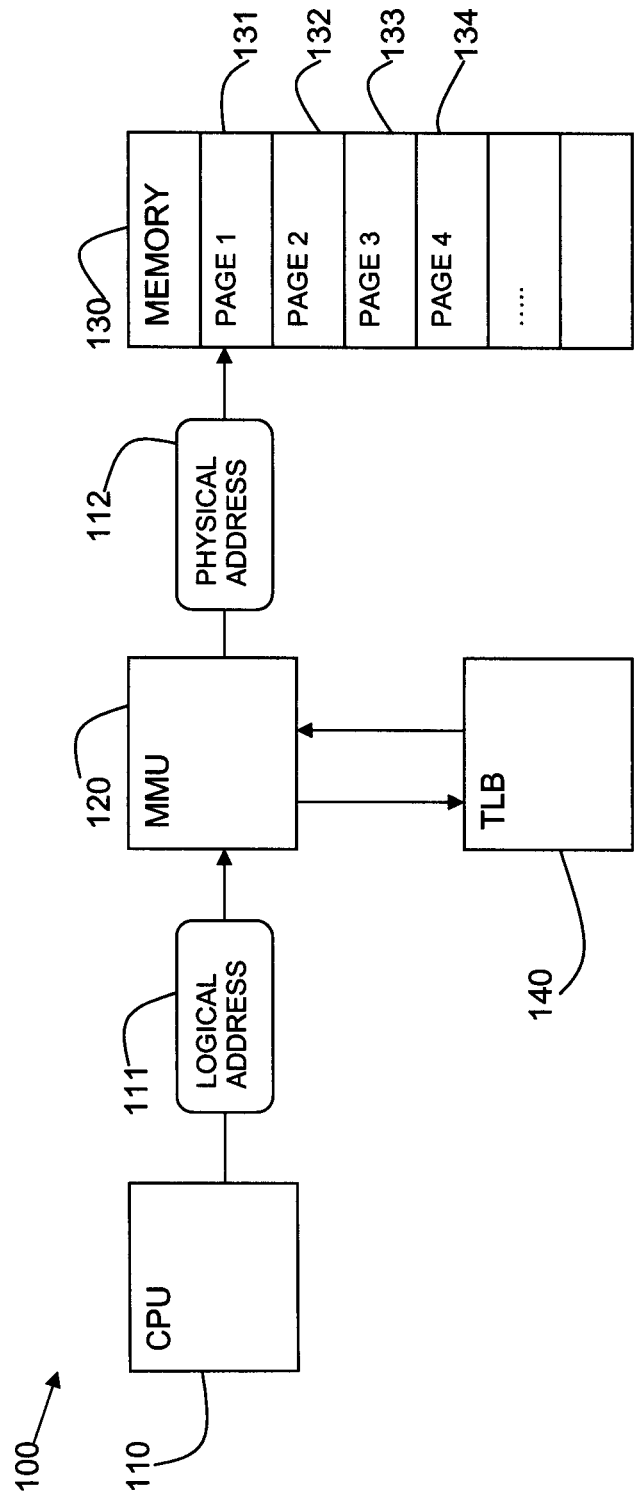
FIG. 1 is a block diagram of a memory management system as known in the prior art.

Referring to FIG. 1, a memory management system 100 as known in the art is shown. The memory management system 100 includes a CPU 110 which use an MMU 120 to translate a logical address 111 of a virtual address space used by the CPU 110 to a physical address 112 in memory 130. The memory 130 is divided into pages 131-134. The MMU 120 translates the logical address 111 to a physical address 112 using a TLB 140.

Typically, an emulator is divided into modules that correspond roughly to the emulated computer's subsystems. An emulator may include a CPU emulator or CPU simulator and a memory subsystem module.

When emulated hardware allows for advanced memory management, the MMU logic can be embedded in the memory emulator, made a module of its own, or integrated into the CPU simulator.

The simplest form of a CPU simulator is an interpreter, which follows the execution flow of the emulated program code and, for every machine code instruction encountered, executes operations on the host processor that are semantically equivalent to the original instructions.

This is made possible by assigning a variable to each register and flag of the simulated CPU. The logic of the simulated CPU can then be directly translated into software algorithms, creating a software re-implementation that basically mirrors the original hardware implementation.

The described method and system relate to emulated processor environments using software refill routines, wherein the location of memory management translations is carried out by the emulated environment and not the guest operating system.

Figure 2:
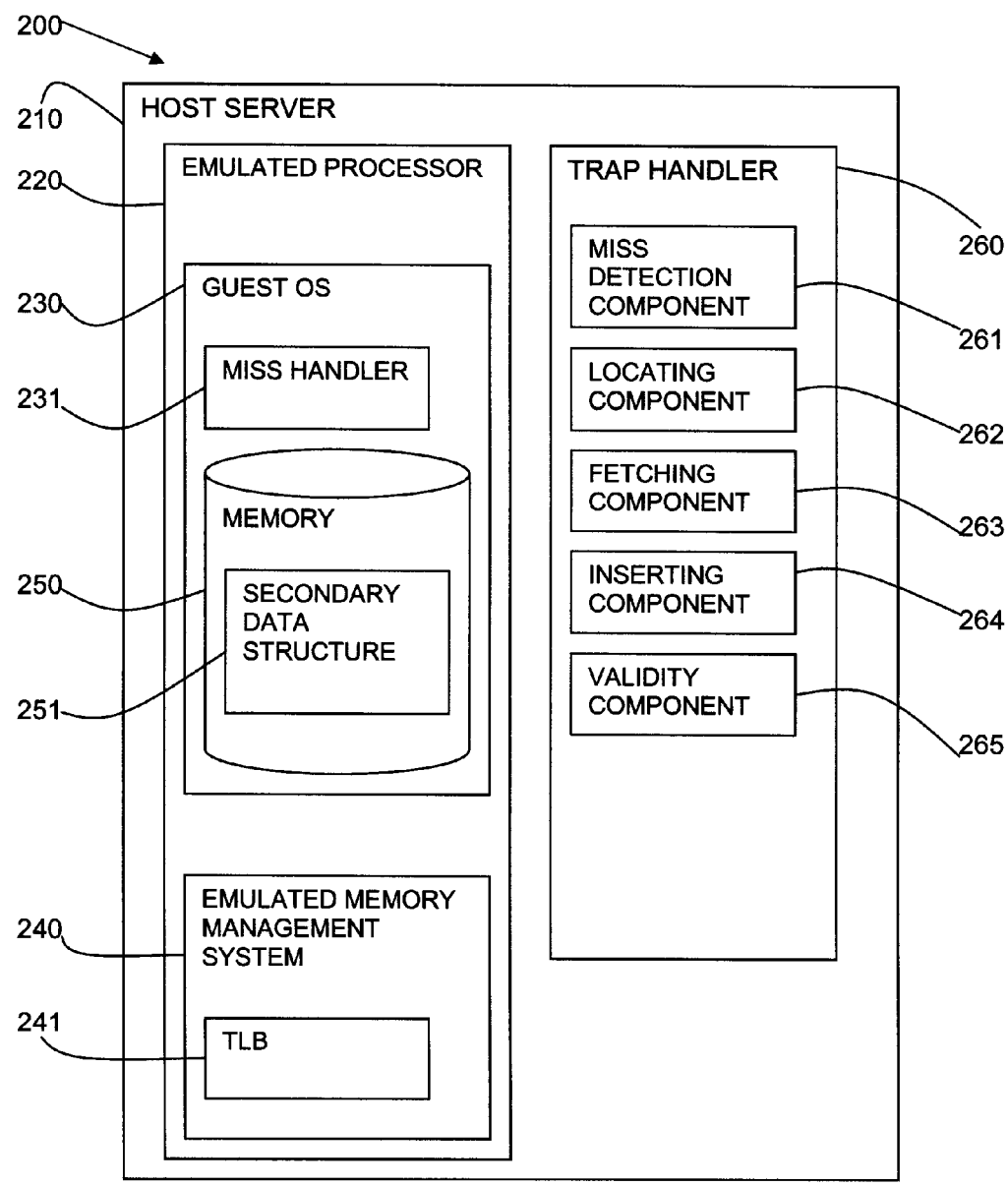
FIG. 2 is block diagram of an emulated system in accordance with the present invention.

Referring to FIG. 2, a block diagram shows an embodiment of the described system 200. A host server 210 hosts a software emulation of a processor 220 or a hypervisor. The emulated processor 220 may be, for example, an emulated RISC processor such as a SPARC or MIPS processor. A guest OS 230 may run on the emulated processor 220 or hypervisor.

The host server 210 may host an emulated memory management system 240 including a translation lookaside buffer (TLB) 241. The emulated memory management system 240 may be integrated into the emulated processor 220 or provided as a module independently. A TLB 241 is a CPU cache that a memory management system 240 uses to improve virtual address to physical address translation speed.

The guest OS 230 includes a miss handler 231 and a secondary data structure 251 which is stored in the guest OS's memory 250 which is a subset of the system RAM. The secondary data structure 251 includes a mapping of virtual addresses to physical addresses which can be used by a trap handler if a TLB 241 entry is not found.

In the described system, a trap handler 260 is provided in the emulation environment of the host server 210, and not part of the guest OS 230.

The trap handler 260 includes a page miss detector component 261 and a locating component 262 to locate the secondary data structure 251. A fetching component 263 fetches missing TLB 241 entries from the secondary data structure 251. An inserting component 264 inserts them in the guest TLB 241 which updates the emulator's guest virtual-to-physical mapping. The trap handler 260 may also include a valid address component 265 to determine if the physical address is valid.

When emulating a processor 220 that software-refills its TLB 241 and the location and layout of the processor's secondary data structure 251 is known, when a page fault is detected a trap handler 260 in the emulation software or hypervisor fetches a translation and inserts it into the guest TLB 241 and emulation memory mappings instead of asking the guest 230 to do it.

Figure 3:
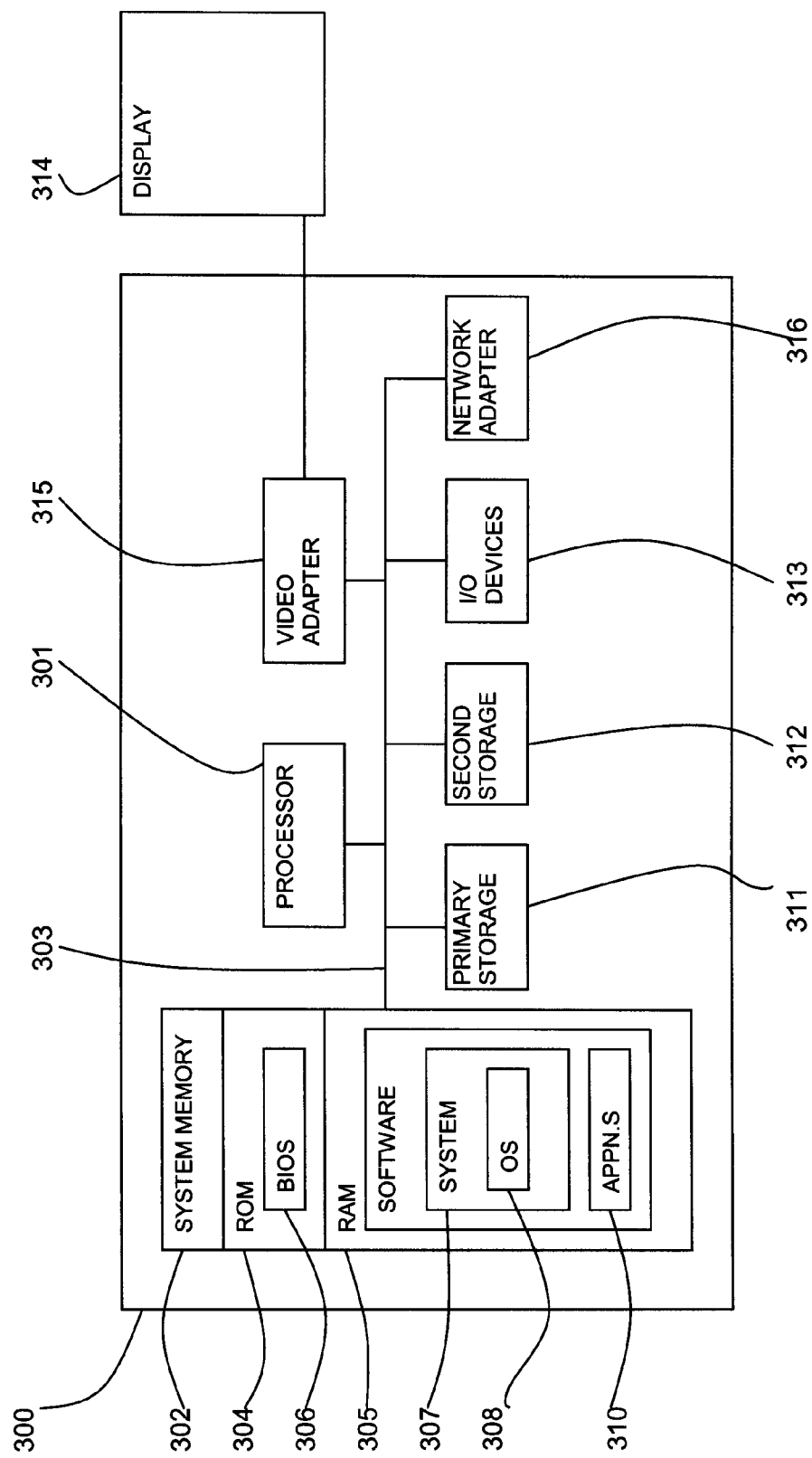
FIG. 3 is a block diagram of a computer system in which the present invention may be implemented.

Referring to FIG. 3, an exemplary system for implementing aspects of the invention includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

The aim of the described method and system is to reduce the time spent servicing guest TLB misses. When a miss is detected, the following events described in relation to FIG. 4 would occur instead of just invoking the guest TLB miss handler code.

Figure 4:
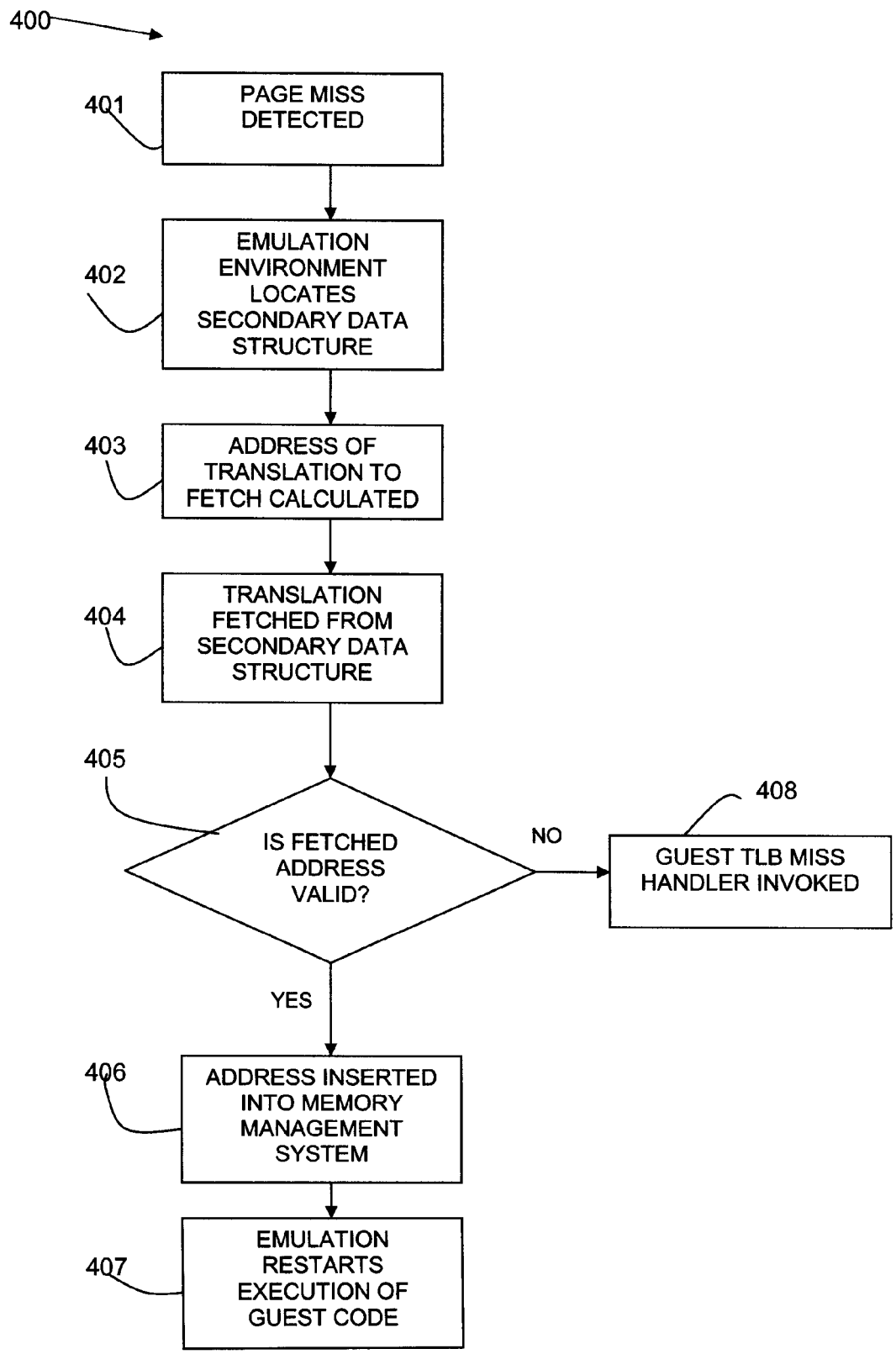
FIG. 4 is a flow diagram of a method in accordance with the present invention.

Referring to FIG. 4, a flow diagram 400 shows an embodiment of the described method. A page miss is detected 401 by a host processor/hypervisor/OS. A page miss can be detected in software in hypervisor/emulation code (if the guest memory management unit (MMU) is entirely emulated in software), or that code can instruct the host processor's hardware to perform MMU duties and the hardware would in this case detect an absent mapping.

The emulation environment locates 402 the in-memory secondary data structure and calculates 403 the address of the translation to fetch. A translation is fetched 404 from the secondary data structure.

It is then determined 405 if the fetched address is valid. If it is valid, it is inserted 406 into the emulated memory management system to make the new virtual page accessible by the guest. The emulation system restarts 407 execution of the guest code, whose memory operation can now proceed.

If the fetched address is not valid, the guest TLB miss handler code is invoked 408.

The complete update to the memory management mappings is, in the general case, done without entering the context of the emulated system (avoiding that expense).

If the guest code accesses an invalid address (or one that is not yet cached in the secondary data structure), the sequence would be as follows:
 1. The page fault is detected and the emulation environment locates the translation to fetch.
 2. If the translation is deemed invalid, the guest TLB miss handler code is invoked.
 3. The guest TLB handler services a TLB miss that 'happens' to hit an invalid address, and invokes the guest OS page miss handler.

The use of this technique is dependent on being able to locate a translation in the guest memory secondary data structure. This involves both knowing the address of the structure and its format.

The use of this method is also dependent on the guest OS TLB miss handler having no side-effects. If the handler does nothing but refill the TLB then the OS cannot be affected if the emulation environment eschews the handler in favour of a faster internal refill.

The described method and system require the address of the secondary data structure to be known. This may be supplied voluntarily by the guest OS (as in the case of a SPARC processor), by inference from knowledge of a specific guest OS, or by para-virtualisation in which case the guest OS knows it is running emulated and presents the information to the emulated system/hypervisor.

Taking the example of a SPARC processor, the OS registers the address of the secondary data structure (in SPARC's case, called the Translation Storage Buffer, or 'TSB') with the CPU (as the CPU features an assist to calculate addresses used in the handler routine). That means the emulation environment of the CPU knows where the secondary data structure is located. However, the format of the TSB is dependent on the guest OS.

SPARC Linux and SPARC Solaris (Linux is a trade mark of Linux Corporation and Solaris is a trade mark of Oracle Corporation) use different formats, but these formats are at least static;

an install-time choice or other OS detection mechanism can be employed. Furthermore, in the default case both SPARC Linux and SPARC Solaris employ TLB miss handlers that do nothing but update the TLB, i.e. have no side-effects. However, Solaris can instrument itself when debugging/profiling—this self-modification can be detected and the described method switched off when profiling is so enabled.

For the example of MIPS processors the procedure is less well-defined as there is no convention for the in-memory data structure format and the location is not presented to the CPU. One would have to use para-virtualisation mechanisms to present the information to the emulation environment, but once done the same performance gains could be achieved. When an OS knows that it is running as a guest in a virtualised system, it can make calls to the hypervisor/emulator to give it extra information for convenience/performance.

As to the host-side refill mechanism, the aim is to minimize the time taken to recognize a fault, locate the guest translation for the guest TLB, and insert a virtual-to-physical mapping on the host side.

Software methods may be used. Invoking a routine to do this at the lowest level of system software (e.g. the hypervisor, or operating system) may be faster than invoking the emulation environment (which may be a Unix process). The lower this is done the better not just in invocation speed but also in speed of setting up a new host translation to represent the new guest translation. A hypervisor or the OS would have access to the host MMU hardware whereas an emulation process would not and would have to make a privileged call into the OS.

The invention can take the form of an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for locating memory management translations in an emulated processor, comprising:
   detecting a type of guest operating system executing on an emulated processor;
   detecting a page miss of a process on the emulated processor, wherein the emulated processor software refills a translation lookaside buffer (TLB);
   locating a secondary data structure in a guest operating system memory, wherein an address of the secondary data structure is inferred from the detected type of the guest operating system and wherein a format of the secondary data structure is determined from the detected type of guest operating system;
fetching a missing translation from the secondary data structure in memory; and
inserting the missing translation in a guest translation lookaside buffer (TLB);
wherein the steps are carried out in the emulated environment and not by a guest operating system.

2. The method as claimed in claim 1, including:
determining if the translation fetched from memory is a valid address.

3. The method as claimed in claim 1, wherein the steps are carried out in a host server of the emulated processor.

4. The method as claimed in claim 3, wherein the host server refills pages direct from the secondary data structure to the guest translation lookaside buffer.

5. The method as claimed in claim 1, including updating the emulated processor's guest virtual to physical mapping.

6. A computer software product for memory management translations in an emulated processor, the product comprising a non-transitory computer-readable storage medium having computer readable program code embodied therewith, the computer readable program code configured to:
detect a type of guest operating system executing on an emulated processor;
detect a page miss of a process on the emulated processor, wherein the emulated processor software refills a translation lookaside buffer (TLB);
locate a secondary data structure in a guest operating system memory, wherein an address of the secondary data structure is inferred from the detected type of the guest operating system and wherein a format of the secondary data structure is determined from the detected type of guest operating system;
fetch a missing translation from the secondary data structure in memory; and
insert the missing translation in a guest translation lookaside buffer;
wherein the steps are carried out in the emulated environment and not by a guest operating system.

7. A system for memory management translations in an emulated processor, comprising:
a host server hosting the emulated processor, wherein the emulated processor software refills a translation lookaside buffer (TLB);
an operating system (OS) detection component for detecting a type of guest operating system executing on the emulated processor;
a guest process operating on the emulated processor;
a trap handler provided in the emulated environment including:
a miss detecting component for detecting a page miss of a process;
a locating component for locating a secondary data structure in a guest operating system memory, wherein an address of the secondary data structure is inferred from the detected type of the guest operating system and wherein a format of the secondary data structure is determined from the detected type of guest operating system;
a fetching component for fetching a missing translation from a secondary data structure in memory;
an inserting component for inserting the missing translation in a guest translation lookaside buffer.

8. The system as claimed in claim 7, wherein the trap handler also include a validity component for determining if the translation fetched from memory is a valid address.

9. The system as claimed in claim 7, wherein the trap handler is provided in the host server of the emulated processor.

10. The system as claimed in claim 9, wherein the host server refills pages direct from the secondary data structure to the guest translation lookaside buffer.

11. The system as claimed in claim 7, wherein the trap handler updates the emulated processor's guest virtual to physical mapping.

* * * * *